US012785012B2

(12) United States Patent
Nakase et al.

(10) Patent No.: US 12,785,012 B2
(45) Date of Patent: Nov. 3, 2026

(54) MULTI-DIRECTIONAL INPUT DEVICE

(71) Applicant: SHENZHEN ZESUM TECHNOLOGY CO., LTD., Shenzhen (CN)

(72) Inventors: Yusho Nakase, Shenzhen (CN); Wei Yang, Shenzhen (CN); Shiying Yang, Shenzhen (CN); Chaoxian Chen, Shenzhen (CN)

(73) Assignee: SHENZHEN ZESUM TECHNOLOGY CO., LTD., Shenzhen (CN)

( * ) Notice: Subject to any disclaimer, the term of this patent is extended or adjusted under 35 U.S.C. 154(b) by 217 days.

(21) Appl. No.: 18/794,931

(22) Filed: Aug. 5, 2024

(65) Prior Publication Data

US 2025/0292977 A1 Sep. 18, 2025

(30) Foreign Application Priority Data

Mar. 18, 2024 (CN) ......................... 202410307281.9

(51) Int. Cl.
*H05K 5/02* (2006.01)
*A63F 13/24* (2014.01)
*H01H 21/24* (2006.01)

(52) U.S. Cl.
CPC ............. *H01H 21/24* (2013.01); *A63F 13/24* (2014.09)

(58) Field of Classification Search
CPC .... H05K 5/0017; H05K 5/0217; H01H 21/24; A63F 13/24
USPC ......................................... 361/807, 809, 810
See application file for complete search history.

(56) References Cited

U.S. PATENT DOCUMENTS 6,160,537 A 12/2000 Liu et al.
2012/0274563 A1* 11/2012 Olsson .................. G05G 9/047 345/161
2024/0060797 A1 2/2024 Takamori et al.

FOREIGN PATENT DOCUMENTS

CN 203674054 U 6/2014
CN 104867736 A 8/2015
CN 107402348 A 11/2017
CN 112439189 A 3/2021
(Continued)

OTHER PUBLICATIONS

Decision to Grant a Patent issued in counterpart Japanese Patent Application No. JP 2024-134835, dated Sep. 16, 2025.
(Continued)

*Primary Examiner* — Hung S. Bui
(74) *Attorney, Agent, or Firm* — Westbridge IP LLC

(57) ABSTRACT

A multi-directional input device includes a housing, an operation stick, a magnetic member, a printed circuit board, a supporting seat, a reset assembly, an elastic sheet, a pressing member and a magnetic induction chip. The operation stick includes an operation portion and a rocker portion connected to the operation portion. The reset assembly includes a pressing plate and a spring. The magnetic induction chip includes a chip and an induction part. Centers of the rocker portion, the magnetic member, the pressing member, the elastic sheet and the induction part are located at a same vertical line. In response to the operation stick being tilted or vertically pressed, the magnetic member is driven to move relative to the induction part in any one direction, and the induction part detects magnetic field variation of the magnetic member and outputs magnetic field variation signal.

10 Claims, 3 Drawing Sheets

(56) References Cited

FOREIGN PATENT DOCUMENTS

| | | | | | |
|---|---|---|---|---|---|
| CN | 113103880 | A | | 7/2021 | |
| CN | 115531859 | A | | 12/2022 | |
| CN | 115738234 | A | | 3/2023 | |
| CN | 219149202 | U | | 6/2023 | |
| CN | 220002932 | U | | 11/2023 | |
| CN | 117707283 | A | | 3/2024 | |
| JP | 2011233396 | A | * | 11/2011 | ............. H01H 25/00 |
| JP | 2014207164 | A | | 10/2014 | |
| KR | 200435650 | Y1 | | 2/2007 | |
| TW | M361670 | U1 | * | 7/2009 | ............. G06F 3/033 |
| TW | 200947489 | A | * | 11/2009 | ............. H01H 25/04 |
| TW | I771814 | B | | 7/2022 | |
| WO | 2012156661 | A1 | | 11/2012 | |

OTHER PUBLICATIONS

Notification to Grant Patent Right for Invention issued in counterpart Chinese Patent Application No. 202410307281.9, dated Apr. 21, 2024.
First Office Action issued in counterpart Taiwanese Patent Application No. 113130570, dated May 11, 2026.

* cited by examiner

MULTI-DIRECTIONAL INPUT DEVICE

CROSS-REFERENCE TO RELATED APPLICATIONS

The present application claims priority to Chinese Patent Application No. 202410307281.9, filed on Mar. 18, 2024, the entire contents of which are incorporated herein by reference.

TECHNICAL FIELD

The present application relates to the technical field of controllers, and in particular to a multi-directional input device.

BACKGROUND multi-directional input devices are widely used in the game control field. A multi-directional input device generally includes a stick, a magnetic member and a magnetic induction chip. By tilting the stick to drive the magnetic member to move, the magnetic induction chip can obtain the direction and displacement of the stick's movement by sensing the magnetic field variation, and thus to achieve functions of positional and directional control in games.

The existing multi-directional input device is also provided with a mechanism for reset tilting and pressing, and since centers of components such as the mechanism for reset tilting and pressing, the stick, the magnetic member and the magnetic induction chip, are not at a same vertical line, when the stick drives the magnetic member to move, the magnetic induction chip cannot accurately and timely sense the magnetic field variation of the magnetic member, which affects users' experience.

SUMMARY

The main purpose of the present application is to provide a multi-directional input device, which aims to solve the problem that existing multi-directional input devices are relatively insensitive and untimely in judging the orientation and movement amount.

In order to achieve the above purpose, the present application provides a multi-directional input device, including:

- a housing, formed with a space provided with an opening at both an upper end and a lower end of the housing;
- an operation stick including an operation portion and a rocker portion connected to the operation portion, wherein a center of the operation portion and a center of the rocker portion are at a same vertical line, and the operation portion is configured to pass through the opening at the upper end of the housing and disposed at an outer side of the housing; an outer surface of the rocker portion is in contact with a lower side wall of the opening of the housing, and the rocker portion is rockably disposed in the space;
- a magnetic member, disposed at a side of the rocker portion away from the operation portion;
- a printed circuit board covering the opening at the lower end of the housing;
- a supporting seat disposed at a side of the printed circuit board facing the space;
- a reset assembly including a pressing plate and a spring disposed in the space, wherein the pressing plate is under the rocker portion; one end of the spring is abutted against the supporting seat, the other end of the spring is abutted against the pressing plate; in response to the operation portion being tilted or pressed, the rocker portion is abutted against the spring through the pressing plate, and the spring elastically deforms to drive the operation stick reset to a middle position;
- an elastic sheet provided on the supporting seat, wherein a shape of the elastic sheet is of an umbrella with a hole at center;
- a pressing member provided on the elastic sheet and located between the elastic sheet and the rocker portion, wherein an end portion of the pressing member is abutted against an opening edge of the elastic sheet; in response to the operation stick being pressed, the rocker portion is abutted against the elastic sheet through the pressing member, and the elastic sheet elastically deforms to have a hand feeling feedback of pressing the operation stick; and
- a magnetic induction chip including a chip and an induction part, wherein the induction part is provided inside the chip, the magnetic induction chip is provided on a surface of the printed circuit board and located below the pressing member;
- wherein a center of the supporting seat is opened with an avoidance hole, and the magnetic induction chip is disposed in the avoidance hole;
- a side of the rocker portion facing an inside of the space is recessed to form an installation recess, and a shape and size of the installation recess are configured to fit the magnetic member; the magnetic member is installed in the installation recess, and a side of the magnetic member facing the pressing member is flush with a recess opening edge of the installation recess;
- the pressing member is disposed below the rocker portion with distance, both an upper end and a lower end of the pressing member are recessed to form an avoidance recess; the avoidance recess at the upper end corresponds to position of the magnetic member in an up and down direction, and the avoidance recess at the lower end corresponds to the magnetic induction chip is the up and down direction; an end of the rocker portion facing the pressing member is partially located in the avoidance recess at the upper end, and the magnetic induction chip is partially located in the avoidance recess at the lower end; and
- centers of the rocker portion, the magnetic member, the pressing member, the elastic sheet and the induction part are located at a same vertical line; in response to the operation stick being tilted or vertically pressed, the magnetic member is driven to move relative to the induction part in any one direction of X, Y, or Z axis, and the induction part is configured to detect magnetic field variation of the magnetic member and output magnetic field variation signal.

In an embodiment of the present application, an upper buckling plate and a lower buckling plate are provided at the upper end and the lower end of the housing, and a center of the upper buckling plate is opened with a hole corresponding to the opening to provide an avoidance space for the rocker portion.

In an embodiment of the present application, the upper buckling plate is bent at two sides to form a buckling slot; two sides of the housing are provided with a buckling snap close to the upper end, and the buckling snap is configured to cooperate with the buckling slot; and the lower buckling plate is bent at two sides to form a buckling slot, and two sides of the housing are provided with a buckling snap close to the lower end; the lower buckling plate is configured to be buckled to the lower end of housing and abutted against the printed circuit board by the cooperation of the buckling slot and buckling snap.

In an embodiment of the present application, a recess wall of the avoidance recess at an upper end of the pressing member is arc-shaped, and a transverse size of the avoidance recess is configured to gradually increase from a recess bottom to a recess opening; and an edge of an end of rocker portion facing the pressing member is filleted to fit the avoidance recess.

In an embodiment of the present application, a cross-sectional shape of the supporting seat is circular, and the avoidance hole is circular.

In an embodiment of the present application, a circle of step is circumferentially provided on a side of the supporting seat facing the elastic sheet, and the elastic sheet is limited to the step.

In an embodiment of the present application, circuits are provided on the printed circuit board, and the magnetic induction chip is provided with pins; the magnetic induction chip is configured to fit a surface of the printed circuit board, and the circuit is electrically connected to the pins.

In an embodiment of the present application, the printed circuit board includes a rigid printed circuit board and a flexible printed circuit board.

In an embodiment of the present application, a plurality of pin plugs are opened on the printed circuit board, and the pin plugs are configured to be plugged with a signal output terminal and a signal output terminal; an inner wall of the pin plugs is electroplated with copper, and the copper on the inner wall is electrically connected to the circuit.

In an embodiment of the present application, pins of the magnetic induction chip include protruding pins extended to an outer side of the chip and metal contact areas disposed on a chip surface.

The multi-directional input device provided in the present application includes a housing, an operation stick, a magnetic member, a printed circuit board, a supporting seat, a reset assembly, an elastic sheet, a pressing member and a magnetic induction chip. The housing is provided with a space having an opening at both an upper end and a lower end of the housing. The printed circuit board covers the opening at the lower end of the housing. The operation portion passes through the opening at the upper end of the housing and disposed at an outer side of the housing. The magnetic member is disposed at a side of the rocker portion away from the operation portion. The reset assembly, the elastic sheet, the pressing member and the magnetic induction chip are provided in the space. When rocking the operation portion to rock the rocker portion, the rocker portion presses the reset assembly, the reset assembly deforms; when releasing the operation portion, the operation stick reset to a middle position under the action of the reset assembly. In response to the operation portion being tilted or pressed to drive the rocker portion move towards an inner space of the space, the rocker portion presses the reset assembly and meanwhile presses the spring through the pressing plate, thereby making the spring elastically deforming to feed back the feeling of pressing the operating stick. The magnetic induction chip provided inside the space includes a chip and an induction part. Centers of the rocker portion, the magnetic member, the pressing member, the elastic sheet and the induction part are located at a same vertical line. In response to the operation stick being tilted or vertically pressed, the magnetic member is driven to move relative to the induction part in any one direction, and the induction part detects magnetic field variation of the magnetic member and outputs magnetic field variation signal. In this way, the multi-directional input device can accurately and timely feedback the direction and amount of movement of the operating stick, thus improving user experience.

BRIEF DESCRIPTION OF THE DRAWINGS

In order to more clearly illustrate the technical solutions in the embodiments of the present application or in the related art, drawings that are needed to illustrate the embodiments and the related art are simply introduced below. Obviously, drawings introduced below are just some of the embodiments in the present application. For those of ordinary skill in the art, other figures may be further obtained without creative efforts according to the structures shown in drawings below.

Figure 1:
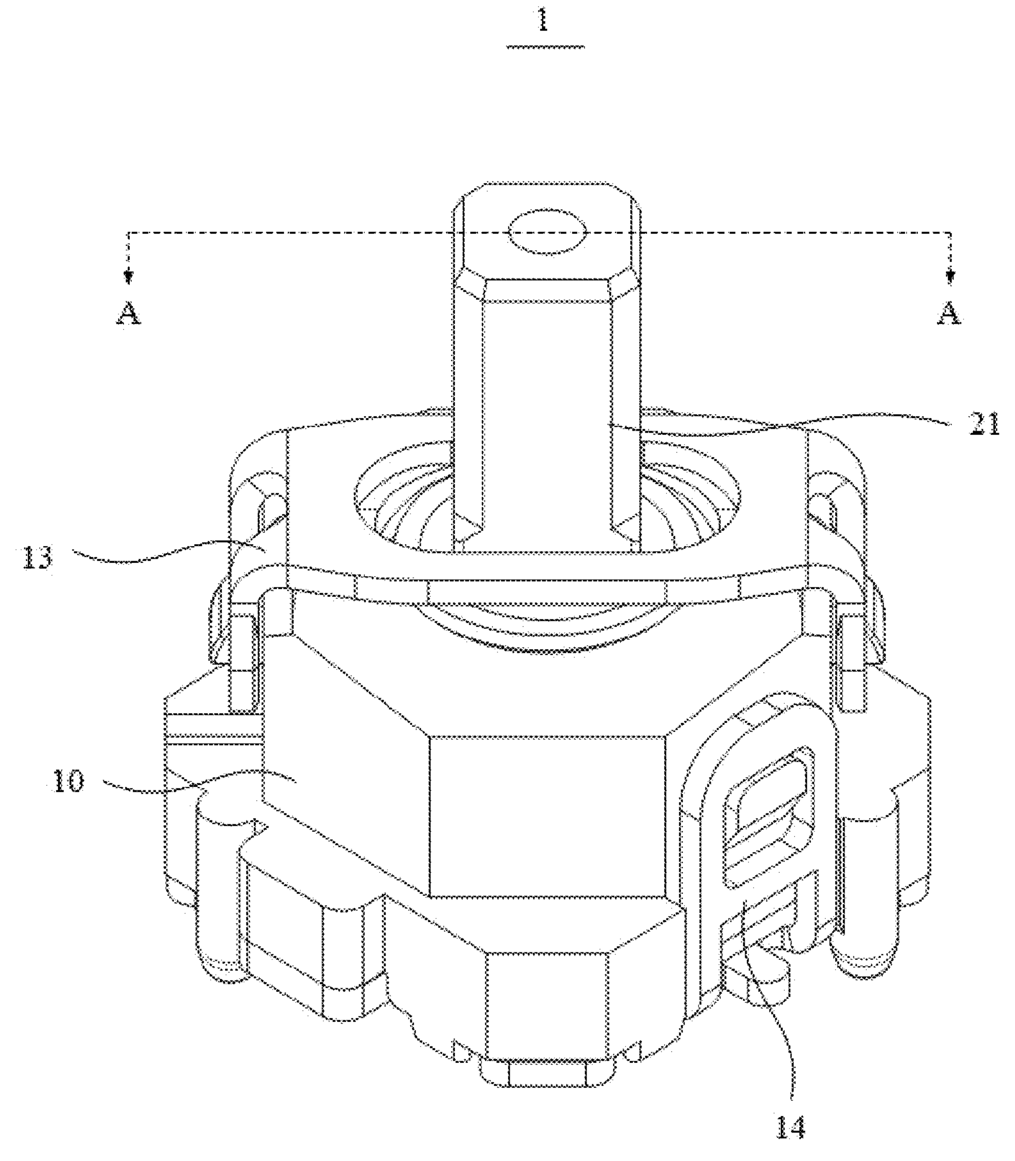
FIG. 1 is a schematic structural view of a multi-directional input device of the present application.

The realization of the objective, the functional feature, and the advantage of present application will be further illustrated referring to the drawings.

DETAILED DESCRIPTION OF THE EMBODIMENTS

The technical solutions of the embodiments of the present application will be clearly and completely described below in conjunction with the accompanying drawings of the embodiments of the present application. It is obvious that the embodiments to be described are only some rather than all the embodiments of the present application. All other embodiments obtained by those of ordinary skill the art based on the embodiments of the present application without creative efforts should fall within the scope of the present application.

It should be noted that all the directional indications (such as up, down, left, right, front, rear, etc.) in the embodiments of the present application are only used to explain the relative positional relationship, movement, or the like of the components in a certain posture (as shown in the drawings). If the specific posture changes, the directional indication will change accordingly.

In the present application, unless otherwise definitely specified and limited, terms such as “connect” and “fix” should be understood in a broad sense. For example, “connect” may be a fixed connection, a detachable connection or integrated as a whole; may be a mechanical connection or an electrical connection; may be directly connected or indirectly connected via an intermediate medium; may also be a internal communication between two components or the interactional relation between two components. For those of ordinary skill in the art, the specific meaning of the above-mentioned terms in the present application can be understood according to specific situations.

Besides, the descriptions associated with, “first” and “second”, etc. in the present application are merely for descriptive purposes, and cannot be understood as indicating or suggesting relative importance or implicitly indicating the number of the indicated technical feature. Therefore, the feature associated with “first” or “second” can expressly or implicitly include at least one such feature. Moreover, the meaning of “and/or” appearing in the present application includes three parallel scenarios. For example, "A and/or B" includes only A, or only B, or both A and B. In addition, the technical solutions of various embodiments can be combined with each other, but the combinations must be based on the realization of those of ordinary skill in the art. When the combination of technical solutions is contradictory or cannot be achieved, it should be considered that such a combination of technical solutions does not exist, nor does it fall within the scope of the present application.

The present application proposes a multi-directional input device 1.

Figure 2:
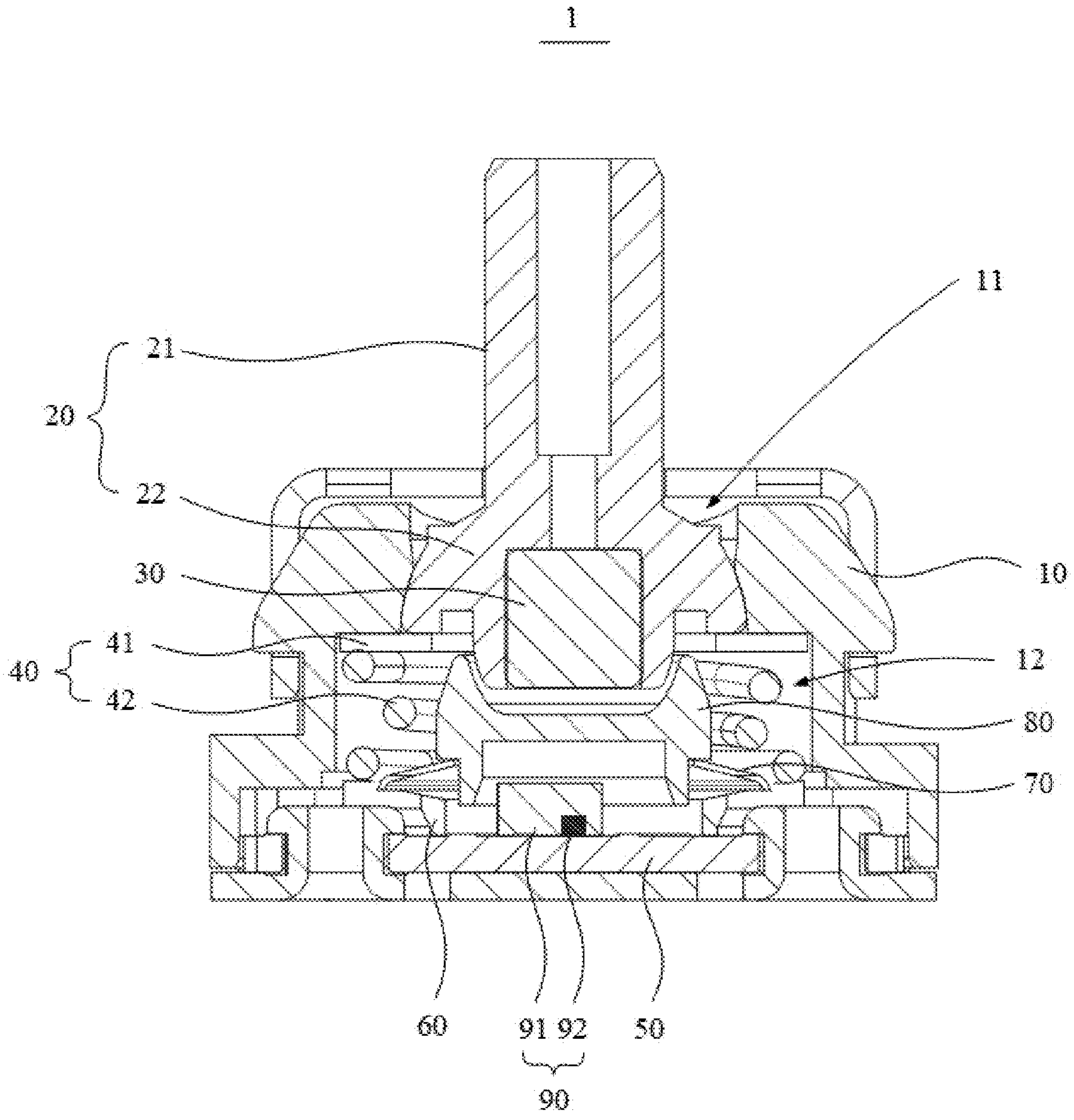
FIG. 2 is a cross-sectional view taken along A-A in FIG. 1.
Figure 3:
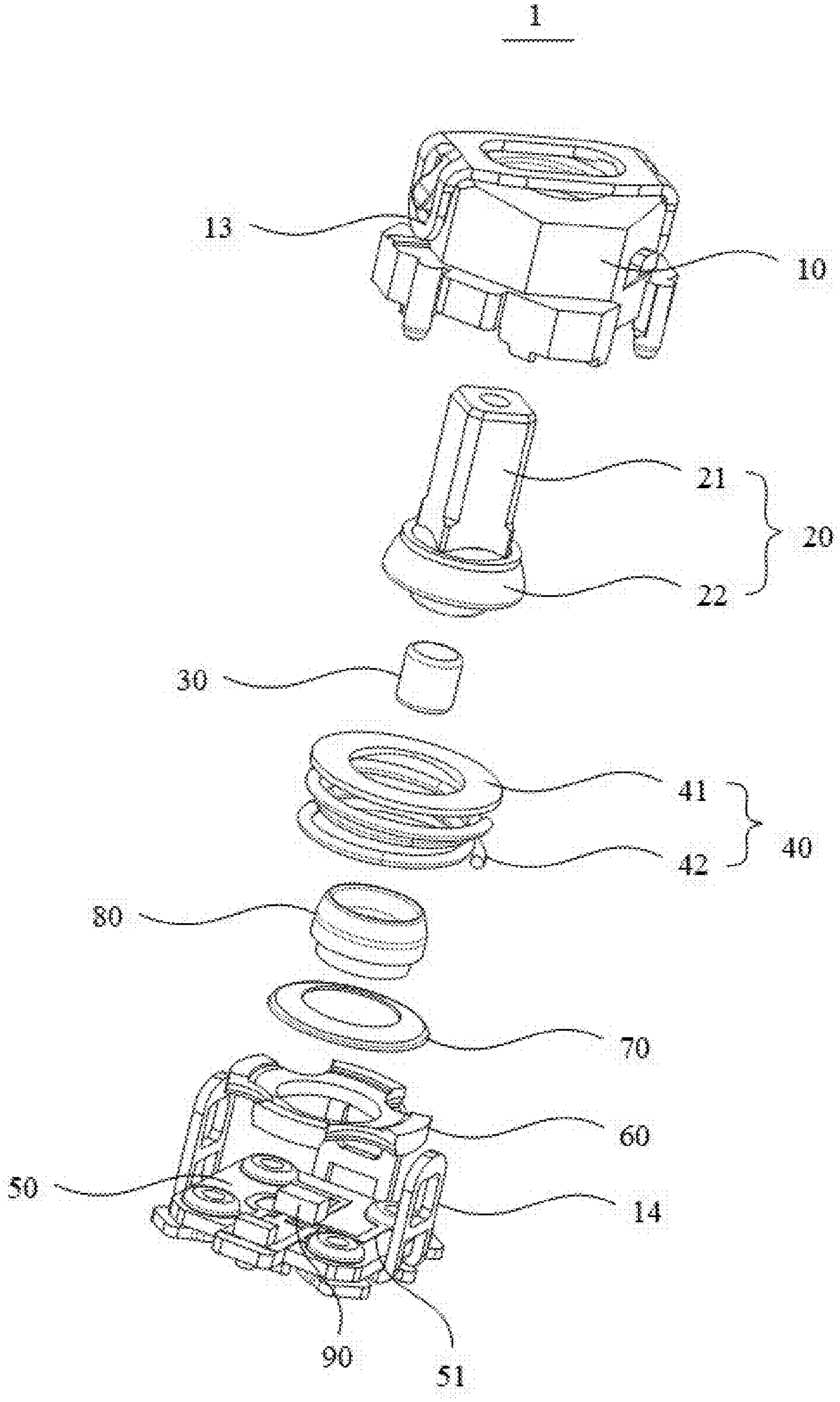
FIG. 3 is an exploded view of a multi-directional input device of the present application.

Referring in combination with FIGS. 1-3, in an embodiment of the present application, the multi-directional input device 1 includes a housing 10, an operation stick 20, a magnetic member 30, a printed circuit board 50, a supporting seat 60, a reset assembly 40, an elastic sheet 70, a pressing member 80 and a magnetic induction chip 90. The housing 10 is provided with space 12 having an opening 11 at both the upper end and the lower end. The operation stick 20 includes an operation portion 21 and a rocker portion 22 connected to the operation portion 21. The center of the operation portion 21 and the center of the rocker portion 22 are at a same vertical line. The operation portion 21 passes through the opening 11 at the upper end of the housing 10 and is disposed on an outer side of the housing 10. An outer surface of the rocker portion 22 is in contact with a lower side wall of the opening 11 of the housing 10. The rocker portion 22 is rockably disposed in the space 12. The magnetic member 30 is disposed on one side of the rocker portion 22 away from the operation portion 21. The printed circuit board 50 covers the opening 11 at the lower end of the housing 10. The supporting seat 60 is disposed on one side of the printed circuit board 50 facing the space 12. The reset assembly 40 includes a pressing plate 41 and a spring 42 disposed in the space 12. The pressing plate 41 is located under the rocker portion 22. One end of the spring 42 is abutted against the supporting seat 60, and the other end of the spring 42 is abutted against the pressing plate 41. When tilting or pressing the operation portion 21, the rocker portion 22 presses the spring 42 through pressing plate 41, and the spring deforms and drives the operation stick 20 to reset to a middle position. The elastic sheet 70 is disposed on the supporting seat 60. The shape of elastic sheet 70 is of an umbrella with a hole at the center. The pressing member 80 is disposed on the elastic sheet 70 and located between the elastic sheet 70 and the rocker portion 22. The end portion of the pressing member 80 is abutted against the edge of the hole of elastic sheet 70. When pressing the operation stick 20, the rocker portion 22 presses the elastic sheet 70 through the pressing member 80, and the elastic sheet 70 deforms to have a hand feeling feedback of pressing the operation stick 20. The magnetic induction chip 90 includes a chip 91 and an induction part 92. The induction part 92 is disposed inside the chip 91. The magnetic induction chip 90 is disposed on the surface of the printed circuit board and located under the pressing member 80. The centers of the rocker portion 22, the magnetic member 30, the pressing member 80, the elastic sheet 70 and the induction part 92 are at a same vertical line, such that when tilting or vertically pressing the operation stick 20 and driving the magnetic member 30 to move relative to the induction part 92 along any direction of X, Y, or Z axis, the induction part 92 can detect the magnetic field variation of magnetic member 30 and output a magnetic field variation signal.

In this embodiment, two end portions of housing 10 that are provided with opening 11 are further provided with an upper buckling plate 13 and a lower buckling plate 14. The center of the upper buckling plate 13 is also opened with a hole corresponding to the opening 11 to provide an avoidance space for the rocker portion 21 to be tilted. The upper buckling plate 13 is bent at two sides and provided with buckling slots. Two sides of the housing 10 are provided with buckling snap close to the upper end. By the cooperation of buckling slots and buckling snaps, the upper buckling plate 13 can be buckled to the upper end of housing 10. The lower buckling plate 14 is bent at two sides and provided with buckling slots. Two sides of the housing 10 are also provided with buckling snaps close to the lower end. By the cooperation of the buckling slots and buckling snaps, the lower buckling plate 14 can be buckled to the lower end of housing 10 and abutted against the printed circuit board 50. By providing the upper buckling plate 13 and lower buckling plate 14, the entire structural stability of multi-directional input device 1 is therefore improved, and also facilitating the assembly and disassembly of various components inside the housing 10.

The outer surface of rocker portion 22 is in contact with the lower side wall of the opening 11 of the housing 10, and the rocker portion 22 can rotate relative to the housing 10. One side of the rocker portion 22 facing the inside of space 12 is recessed to form an installation recess. The shape and size of the installation recess fit the magnetic member 30. The magnetic member 30 is installed in the installation recess. One side of the magnetic member 30 facing the pressing member 80 is flush with the opening of the installation recess.

The pressing member 80 is disposed under the rocker portion 22 with a certain distance. Both the upper end and the lower end of the pressing member 80 are recessed to form an avoidance recess. The avoidance recess at the upper end corresponds to the position of magnetic member 30 in the up and down direction. The avoidance recess at the lower end corresponds to the position of magnetic induction chip 90 in the up and down direction. An end of the rocker portion 22 facing the pressing member 80 is partially disposed in the avoidance recess at the upper end. The magnetic induction chip 90 is partially disposed in the avoidance recess at the lower end. By providing the avoidance recess at both the upper end and the lower end of the pressing member 80, the structure size of multi-directional input device 1 in the vertical direction is reduced. The recess wall of the avoidance recess at the upper end is arc-shaped, and its transverse size gradually increases from the recess bottom to the recess opening. The edge of the end of rocker portion 22 facing the pressing member 80 is filleted to fit the avoidance recess. When the operation stick 20 is not pressed, the rocker portion 22 can also be partially displaced in the avoidance recess at the upper end of pressing member 80 and is spaced apart with the avoidance recess at the upper end, such that the structure size of multi-directional input device 1 in the vertical direction is further reduced.

In order to facilitate the operation stick 20 resetting its position and orientation after being tilted, a reset assembly 40 is provided in the space 12. The reset assembly 40 consists of spring 42 and pressing plate 41. The center of the pressing plate 41 is opened with a hole to provide an avoidance space for a protruded portion of rocker portion 22 facing the space 12. One end of the spring 42 is abutted against pressing plate 41, the other end of the spring 42 is abutted against supporting seat 60. The pressing plate 41 is abutted against the inner wall of the upper end of housing 10 under the elastic force of spring 42, and the rocker portion 22 is also abutted against the upper surface of pressing plate 41. In this way, when tilting or pressing the operation portion 21, the rocker portion 22 will be driven to press on the surface of pressing plate 41 to make the spring 42 deform; and when stop tilting or pressing the operation portion 21, the operation stick 20 resets to the initial position and orientation under the elastic force of spring 42.

In order to feel the hand feeling that the operation stick 20 has when it is pressed, an elastic sheet 70 is provided below the pressing member 80 in an embodiment of the present application. The elastic sheet 70 has a certain elasticity, and its shape is of an umbrella with a hole in the center, so that when the pressing member 80 is abutted against the hole edge of elastic sheet 70, the elastic sheet 70 plays roles of supporting the pressing member 80 and providing a pressing hand feeling, so that user's operation experience is improved. It can be understood that the springing back of the operation stick 20 after being pressed is achieved by the elastic sheet 70 together with the reset assembly 40. In the first stage of springing back, the elastic force is provided by the elastic sheet 70 and the spring 42 in reset assembly 40. After the elastic sheet 70 springs back to the initial state, the rocker portion 22 and the pressing member 80 begin to detach from each other, and the springing back comes to the second stage. In the second stage, the elastic force for springing back is provided by the spring 42 in reset assembly 40 until the reset assembly 40 and the operation stick 20 spring back to the initial state.

In order to improve the accuracy and timeliness of multi-directional input device 1 detecting orientation and movement, the centers of rocker portion 22, magnetic member 30, pressing member 80, elastic sheet 70 and the induction part 92 are arranged at a same vertical line, so that the magnetic field of magnetic member 30 can be vertically transmitted to the induction part 92 of magnetic induction chip 90, and the propagation distance of magnetic induction line is reduced, whereby the accuracy and sensitivity of the induction part 92 detecting the magnetic field variation of magnetic member 30 is improved.

Referring in combination with FIGS. 2 and 3, in an embodiment of the present application, the center of supporting seat 60 is opened with an avoidance hole, and the magnetic induction chip 90 is disposed in the avoidance hole.

In this embodiment, the cross-sectional shape of supporting seat 60 is circular, and the shape of avoidance hole is also circular, so as to fit the elastic sheet 70 and the pressing member 80. A circle of step is circumferentially provided on a side of the supporting seat 60 facing the elastic sheet 70, and the elastic sheet 70 is limited to the step to improve the stability of the elastic sheet when deforming. The printed circuit board 50 is configured with elements such as magnetic induction chip 90, capacitors and resistors. The avoidance hole provides avoidance space for these elements. The magnetic induction chip 90 is disposed in the avoidance hole, so that the distance between the magnetic member 30 and the magnetic induction chip 90 is reduced, whereby the accuracy and sensitivity of multi-directional input device 1 detecting orientation and movement is further improved.

Referring to FIG. 3, in an embodiment of the present application, circuit 51 is provided on the printed circuit board 50, the magnetic induction chip 90 is provided with pins, the magnetic induction chip 90 fits the surface of printed circuit board 50, and the circuit is electrically connected to these pins.

In this embodiment, the printed circuit board may be a rigid printed circuit board or a flexible printed circuit board. Multiple pin plugs are opened on the printed circuit board 50. These pin plugs are configured to be plugged with a signal output terminal and a signal output terminal. The inner wall of the pin plug is electroplated with copper, the copper on the inner wall is electrically connected to the circuit 51. Pins of the magnetic induction chip 90 may be protruding pins extended to the outer side of the chip or metal contact areas disposed on the chip surface. The magnetic induction chip 90 is connected to signal output terminals and signal input terminals through these pins, circuit 51 and electroplated copper to achieve magnetic induction signal input and output, so as to allow the multi-directional input device to detect the direction and displacement of the movement when the user operates the operation stick 20.

The above-mentioned embodiments are only some embodiments of the present application, and are not intended to limit the scope of the present application. Any equivalent structure conversion made by using the description and the content of accompanying drawings of the present application, direct or indirect application in other related technical fields, should all fall within the scope of the present application.

What is claimed is:

1. A multi-directional input device, comprising:

a housing, formed with a space provided with an opening at both an upper end and a lower end of the housing;

an operation stick comprising an operation portion and a rocker portion connected to the operation portion, wherein a center of the operation portion and a center of the rocker portion are at a same vertical line, and the operation portion is configured to pass through the opening at the upper end of the housing and disposed at an outer side of the housing; an outer surface of the rocker portion is in contact with a lower side wall of the opening of the housing, and the rocker portion is rockably disposed in the space;

a magnetic member, disposed at a side of the rocker portion away from the operation portion;

a printed circuit board covering the opening at the lower end of the housing;

a supporting seat disposed at a side of the printed circuit board facing the space;

a reset assembly comprising a pressing plate and a spring disposed in the space, wherein the pressing plate is under the rocker portion; one end of the spring is abutted against the supporting seat, the other end of the spring is abutted against the pressing plate; in response to the operation portion being tilted or pressed, the rocker portion is abutted against the spring through the pressing plate, and the spring elastically deforms to drive the operation stick reset to a middle position;

an elastic sheet provided on the supporting seat, wherein a shape of the elastic sheet is of an umbrella with a hole at center;

a pressing member provided on the elastic sheet and located between the elastic sheet and the rocker portion, wherein an end portion of the pressing member is abutted against an opening edge of the elastic sheet; in response to the operation stick being pressed, the rocker portion is abutted against the elastic sheet through the pressing member, and the elastic sheet elastically deforms to have a hand feeling feedback of pressing the operation stick; and a magnetic induction chip comprising a chip and an induction part, wherein the induction part is provided inside the chip, the magnetic induction chip is provided on a surface of the printed circuit board and located below the pressing member;

wherein a center of the supporting seat is opened with an avoidance hole, and the magnetic induction chip is disposed in the avoidance hole;

a side of the rocker portion facing an inside of the space is recessed to form an installation recess, and a shape and size of the installation recess are configured to fit the magnetic member; the magnetic member is installed in the installation recess, and a side of the magnetic member facing the pressing member is flush with a recess opening edge of the installation recess;

the pressing member is disposed below the rocker portion with distance, both an upper end and a lower end of the pressing member are recessed to form an avoidance recess; the avoidance recess at the upper end corresponds to position of the magnetic member in an up and down direction, and the avoidance recess at the lower end corresponds to the magnetic induction chip is the up and down direction; an end of the rocker portion facing the pressing member is partially located in the avoidance recess at the upper end, and the magnetic induction chip is partially located in the avoidance recess at the lower end; and centers of the rocker portion, the magnetic member, the pressing member, the elastic sheet and the induction part are located at a same vertical line; in response to the operation stick being tilted or vertically pressed, the magnetic member is driven to move relative to the induction part in any one direction of X, Y, or Z axis, and the induction part is configured to detect magnetic field variation of the magnetic member and output magnetic field variation signal.

2. The multi-directional input device of claim 1, wherein an upper buckling plate and a lower buckling plate are provided at the upper end and the lower end of the housing, and a center of the upper buckling plate is opened with a hole corresponding to the opening to provide an avoidance space for the rocker portion.

3. The multi-directional input device of claim 2, wherein the upper buckling plate is bent at two sides to form a buckling slot; two sides of the housing are provided with a buckling snap close to the upper end, and the buckling snap is configured to cooperate with the buckling slot; and the lower buckling plate is bent at two sides to form a buckling slot, and two sides of the housing are provided with a buckling snap close to the lower end; the lower buckling plate is configured to be buckled to the lower end of housing and abutted against the printed circuit board by the cooperation of the buckling slot and buckling snap.

4. The multi-directional input device of claim 1, wherein a recess wall of the avoidance recess at an upper end of the pressing member is arc-shaped, and a transverse size of the avoidance recess is configured to gradually increase from a recess bottom to a recess opening; and an edge of an end of rocker portion facing the pressing member is filleted to fit the avoidance recess.

5. The multi-directional input device of claim 1, wherein a cross-sectional shape of the supporting seat is circular, and the avoidance hole is circular.

6. The multi-directional input device of claim 1, wherein a circle of step is circumferentially provided on a side of the supporting seat facing the elastic sheet, and the elastic sheet is limited to the step.

7. The multi-directional input device of claim 1, wherein circuits are provided on the printed circuit board, and the magnetic induction chip is provided with pins; the magnetic induction chip is configured to fit a surface of the printed circuit board, and the circuit is electrically connected to the pins.

8. The multi-directional input device of claim 7, wherein the printed circuit board comprises a rigid printed circuit board and a flexible printed circuit board.

9. The multi-directional input device of claim 7, wherein a plurality of pin plugs are opened on the printed circuit board, and the pin plugs are configured to be plugged with a signal output terminal and a signal output terminal; an inner wall of the pin plugs is electroplated with copper, and the copper on the inner wall is electrically connected to the circuit.

10. The multi-directional input device of claim 7, wherein pins of the magnetic induction chip comprise protruding pins extended to an outer side of the chip and metal contact areas disposed on a chip surface.

* * * * *